(12) United States Patent
Sakai et al.

(10) Patent No.: US 12,290,967 B2
(45) Date of Patent: May 6, 2025

(54) COMBINATION OF MOLD AND RELEASE FILM, RELEASE FILM, MOLD, AND METHOD FOR MANUFACTURING MOLDED ARTICLE

(71) Applicant: KOBAYASHI & CO., LTD., Tokyo (JP)

(72) Inventors: Keisuke Sakai, Matsudo (JP); Nanae Tanaka, Matsudo (JP); Kenji Miyashita, Tokyo (JP); Go Kobayashi, Tokyo (JP)

(73) Assignee: KOBAYASHI & CO., LTD., Tokyo (JP)

( * ) Notice: Subject to any disclaimer, the term of this patent is extended or adjusted under 35 U.S.C. 154(b) by 87 days.

(21) Appl. No.: 17/440,146

(22) PCT Filed: Sep. 24, 2019

(86) PCT No.: PCT/JP2019/037198
§ 371 (c)(1),
(2) Date: Sep. 16, 2021

(87) PCT Pub. No.: WO2020/188859
PCT Pub. Date: Sep. 24, 2020

(65) Prior Publication Data
US 2022/0152882 A1    May 19, 2022

(30) Foreign Application Priority Data
Mar. 20, 2019   (JP) .................................. 2019-052290

(51) Int. Cl.
*B29C 33/68*   (2006.01)
*B29C 33/42*   (2006.01)
(Continued)

(52) U.S. Cl.
CPC .............. *B29C 33/68* (2013.01); *B29C 33/42* (2013.01); *B29C 43/18* (2013.01); *B29C 43/50* (2013.01);
(Continued)

(58) Field of Classification Search
CPC . B29C 33/68; B29C 33/18; B29C 2043/3605; B29C 2043/14663
See application file for complete search history.

(56) References Cited

U.S. PATENT DOCUMENTS 6,344,162 B1    2/2002   Miyajima ................. 264/272.14
11,220,028 B1*  1/2022   Cardenas ......... B29D 11/00836
(Continued)

FOREIGN PATENT DOCUMENTS

DE    3918389 A1 *  12/1990  ............. B29C 33/68
EP    0971401 A2     1/2000
(Continued)

OTHER PUBLICATIONS

Machine translation of DE3918389A1, Dec. 20, 1990 (Year: 1990).*
(Continued)

*Primary Examiner* — Benjamin A Schiffman
(74) *Attorney, Agent, or Firm* — Stein IP, LLC

(57) ABSTRACT

An object of the invention is to provide a method for conditioning a surface of a molded article. The present invention relates to a combination of a mold used for curing a thermosetting resin and a release film placed between the thermosetting resin and the mold during the curing. The release film comprises a base layer formed of a thermoplastic resin and a surface layer formed of a particle-containing fluororesin and laminated to the face which is placed during the curing on the side of the thermosetting resin among the
(Continued)

two faces of the base layer. The mold has an irregularity formed on the face brought into contact with the release film during the curing.

12 Claims, 3 Drawing Sheets

(51) Int. Cl.
  *B29C 43/18* (2006.01)
  *B29C 43/50* (2006.01)
  *B29C 45/02* (2006.01)
  *B29C 45/14* (2006.01)
  *B29C 45/40* (2006.01)
  *B29K 27/18* (2006.01)

(52) U.S. Cl.
  CPC ........ *B29C 45/02* (2013.01); *B29C 45/14754* (2013.01); *B29C 45/40* (2013.01); *B29K 2027/18* (2013.01)

(56) References Cited

U.S. PATENT DOCUMENTS

| | | | | |
|---|---|---|---|---|
| 2013/0189387 | A1 | 7/2013 | Bravet | 425/89 |
| 2021/0253815 | A1* | 8/2021 | Sakai | H01L 23/293 |
| 2021/0257228 | A1* | 8/2021 | Sakai | B29C 33/68 |
| 2022/0396011 | A1* | 12/2022 | Sakai | C08K 3/36 |
| 2023/0054528 | A1* | 2/2023 | Sakai | B29C 37/0075 |

FOREIGN PATENT DOCUMENTS

| | | | | |
|---|---|---|---|---|
| JP | H 02-305827 A | | 12/1990 | |
| JP | H 03-86729 A | | 4/1991 | |
| JP | H 03-110124 A | | 5/1991 | |
| JP | H 04-028510 A | | 1/1992 | |
| JP | 2000-210987 A | | 8/2000 | |
| JP | 2000-299335 A | | 10/2000 | |
| JP | 2003026427 A | * | 1/2003 | ............ B29C 33/68 |
| JP | 2004-17483 A | | 1/2004 | |
| JP | 201-138985 A | | 7/2011 | |
| JP | 2011-138985 A | | 7/2011 | |
| JP | 2012-256925 A | | 12/2012 | |
| JP | 2014-065218 A | | 4/2014 | |
| JP | 2014-188746 A | | 10/2014 | |
| JP | 2014-225619 A | | 12/2014 | |
| JP | 2015-074201 A | | 4/2015 | |
| JP | 2016-092272 A | | 5/2016 | |
| JP | 2018-202834 A | | 12/2018 | |
| JP | 2020002287 A | * | 1/2020 | ............ F01C 17/06 |
| JP | 2020004896 A | * | 1/2020 | ............ F01C 17/06 |
| JP | 2020007458 A | * | 1/2020 | ............ F01C 17/06 |
| JP | 2020152101 A | * | 9/2020 | |
| JP | 2021062606 A | * | 4/2021 | |
| KR | 20160032105 A | * | 3/2016 | ............ F01C 17/06 |
| SG | 11201810343 T | | 11/2017 | |
| SG | 11202012852 T | | 12/2019 | |
| WO | WO-2018079596 A1 | * | 5/2018 | ............ B32B 27/00 |
| WO | WO 2018/173682 A1 | | 9/2018 | |

OTHER PUBLICATIONS

Machine translation of JP2014188746A, Oct. 6, 2014 (Year: 2014).*
Machine translation of JP2016092272A, May 23, 2016 (Year: 2016).*
Machine translation of WO2018173682A1, Sep. 27, 2018 (Year: 2018).*
Machine translation of WO-2018079596-A1, May 3, 2018 (Year: 2018).*
Office Action mailed on Feb. 8, 2023, issued to counterpart Singapore Application No. 11202110143Q.
International Search Report mailed Nov. 5, 2019, issued to International Application No. PCT/JP2019/037198.
First Office Action mailed Oct. 15, 2019, issued to corresponding Japanese Application No. 2019-052290.
Final Office Action mailed Nov. 25, 2019, issued to corresponding Japanese Application No. 2019-052290.
Notice of Reasons for Refusal dated Dec. 20, 2022, issued by the Japanese Patent Office in corresponding application JP2020-021299.
Chinese Office Action mailed Jun. 21, 2024, issued to corresponding Chinese Application No. 201980094335.5.
Office Action mailed Jan. 31, 2024, issued to corresponding Singapore Application No. 11202110143Q.
VDI 3400 Surface Finishes Definition, VDI 3400 Depth. Oct. 15, 2018 (see Table that indicates surface roughness that can be achieved by using EDM) Citation not enclosed due to copyright restrictions. A copy may be obtained from the Wayback Machine at https://web.archive.org/web/20181015183120/https://upmold.com/vdi-3400-surfacefinish/.
Office Action mailed Mar. 5, 2024, issued to corresponding Chinese Application No. 201980094335.5.
Indonesia Office Action mailed Oct. 18, 2024, issued to Indonesia Application No. P00202307302.

* cited by examiner

[Fig. 1]
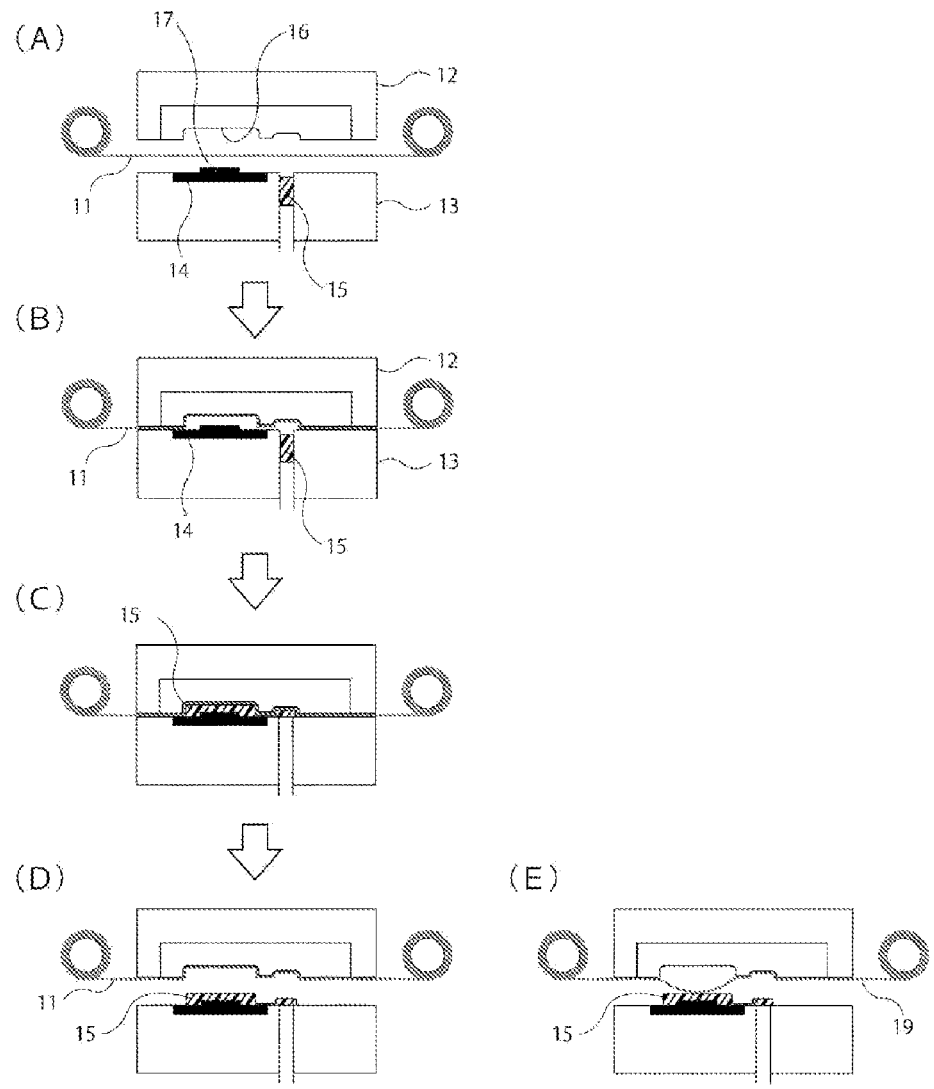
[Fig. 2]
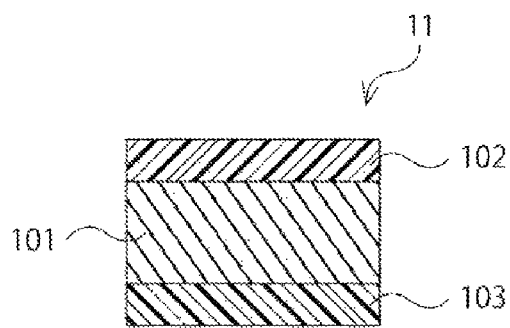

[Fig. 3]
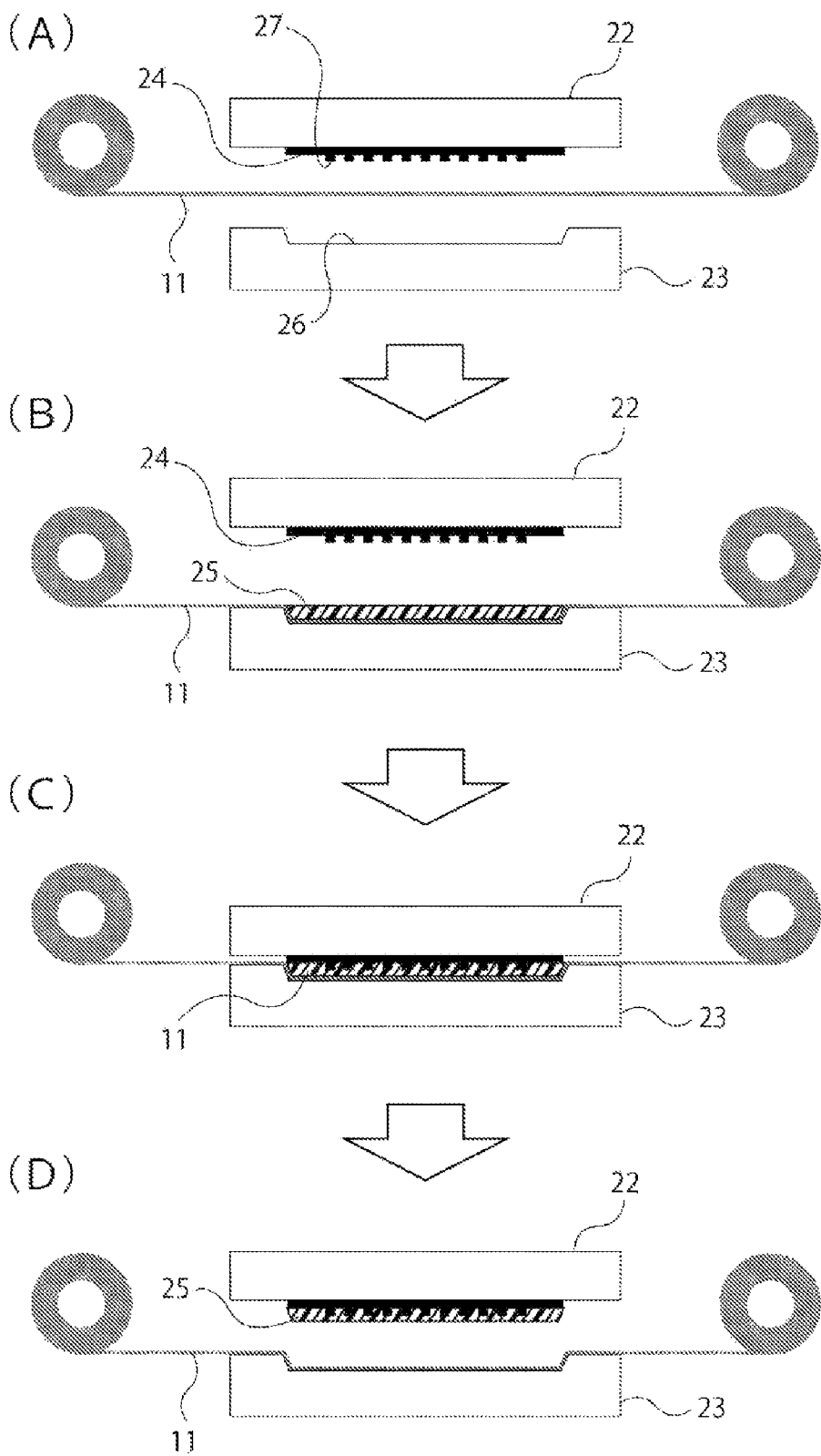

[Fig. 4]
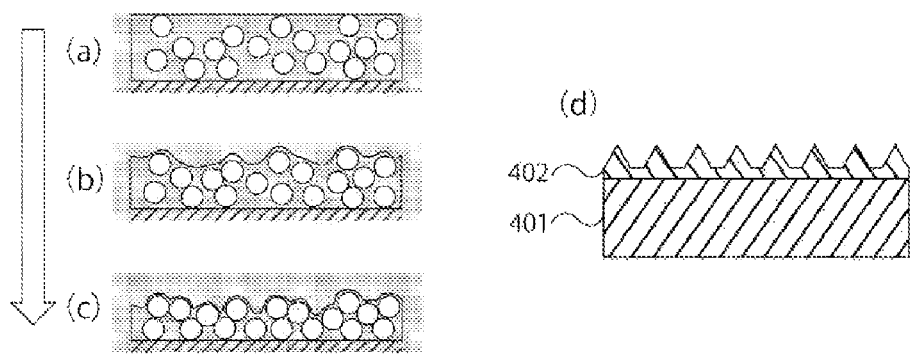
[Fig. 5]
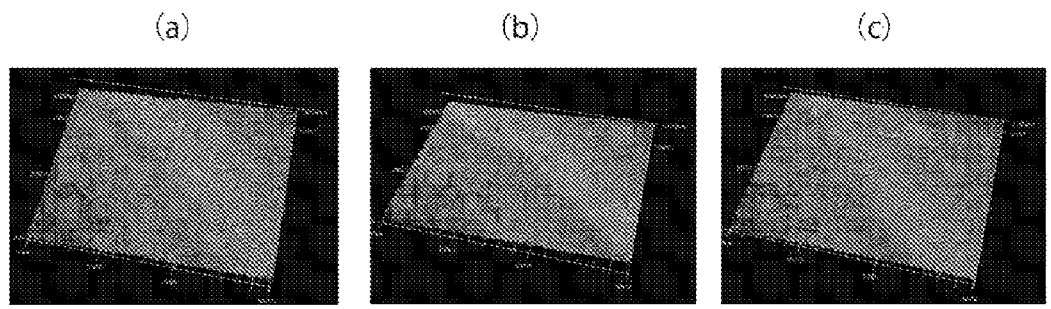

COMBINATION OF MOLD AND RELEASE FILM, RELEASE FILM, MOLD, AND METHOD FOR MANUFACTURING MOLDED ARTICLE

CROSS-REFERENCE TO RELATED APPLICATIONS

This application is a national stage of International Application No. PCT/JP2019/037198, filed Sep. 24, 2019, which claims the benefit of Japanese Application No. 2019-052290, filed Mar. 20, 2019, in the Japanese Patent Office, the disclosures of which are incorporated herein by reference.

BACKGROUND OF THE INVENTION

Field of the Invention

The present invention relates to a combination of a mold and a release film, a release film, a mold, and a method for manufacturing a molded article, and more specifically relates to a combination of a mold and a release film used for transfer molding or compression molding, a release film and a mold constituting the combination as well as a method of manufacturing a molded article using the combination.

Description of the Related Art

In order to seal a semiconductor with a resin, a molding technique such as transfer molding and compression molding is used. In the molding technique, a release film is often used to facilitate the release of a molded article from a mold after a resin is cured in the mold, and various release films have been developed.

For example, Patent Document 1 discloses a release film that includes a coated film including a composition containing a fluorine resin (A) having a function group X and a release component (B) and includes a layer including a non-fluorinated polymer.

Patent Document 2 also discloses a resin sealing mold for sealing a semiconductor chip-loaded product to be molded using a resin filled in the mold while clumping the product between first and second molds facing to each other, wherein, in at least one of the first and second molds, a first heater is placed at a position closer to the mold surface than the thickness of the resin, which is filled in the mold, in the mold-facing direction.

CITATION LIST

Patent Documents

Patent Document 1: JP-A 2015-74201
Patent Document 2: JP-A 2012-256925

BRIEF SUMMARY OF THE INVENTION

The surface of a molded article may be required to be conditioned. For example, the surface of the molded article may be engraved by a laser marker, and it is required sometimes to form a surface capable of increasing the engraved mark visibility or the reader readability.

The present invention is intended to provide a novel method for conditioning the surface of the molded article.

The inventors of the present invention have found that a specific combination of a mold and a release film is suitable for conditioning the surface of the molded article.

The present invention provides a combination of a mold used for curing a thermosetting resin and a release film placed between the thermosetting resin and the mold during the curing, wherein:

the release film comprises: a base layer formed of a thermoplastic resin and, a surface layer formed of a particle-containing fluororesin and laminated to the face which is placed during the curing on the side of the thermosetting resin among the two faces of the base layer, and the mold has an irregularity formed on the face that is to be brought into contact with the release film during the curing.

The average particle size of the particle determined by laser diffraction particle size analysis may be 1 µm to 10 µm.

The surface roughness Ra of the face of the mold brought into contact with the release film during the curing may be 1 µm to 4 µm.

The fluororesin of the surface layer may comprise a tetrafluoroethylene resin.

The fluororesin of the surface layer may further contain an isocyanate curing agent.

The particle may be silicon dioxide.

The thermoplastic resin of the base layer may be a polyethylene terephthalate resin.

The thermosetting resin may be an epoxy resin.

The combination may be used for forming irregularity on a surface of a cured product of the thermosetting resin.

The irregularity formed on the surface of a cured product of the thermosetting resin may be different from the irregularity on the mold.

The combination may be used for transfer molding or compression molding.

The present invention also provides a release film employed in combination with a mold for curing a thermosetting resin, wherein:

the release film comprises a base layer formed of a thermoplastic resin and a surface layer formed of a particle-containing fluororesin and laminated to the face which is placed during the curing on the side of the thermosetting resin among the two faces of the base layer, and, the mold has an irregularity formed on the face brought into contact with the release film during the curing.

The present invention also provides a mold employed in combination with a release film for curing a thermosetting resin, wherein:

the mold has an irregularity formed on the face brought into contact with the release film during the curing, and, the release film comprises a base layer formed of a thermoplastic resin and, a surface layer formed of a particle-containing fluororesin and laminated to the face which is placed during the curing on the side of the thermosetting resin among the two faces of the base layer.

The present invention also provides a method of manufacturing a molded article comprising a placing step in which a release film is placed in a mold used for curing a thermosetting resin, a curing step after the placing step, in which the thermosetting resin is cured, while being in contact with the release film, in the mold, and, a releasing step after the curing step, in which the cured thermosetting resin is released from the mold thereby obtaining a molded article, wherein:

the release film comprises a base layer formed of a thermoplastic resin and a surface layer formed of a particle-containing fluororesin and laminated to the face which is placed during the curing on the side of the thermosetting resin among the two faces of the base layer, and, the mold has an irregularity formed on the face brought into contact with the release film during the curing.

According to the present invention, it becomes possible to condition the surface of a molded article. For example, according to the present invention, it is possible to improve the visibility and the readability of an engraved mark formed by a laser marker.

The effect of the invention is not necessarily limited to that described in this paragraph and may be any of the effect described in the present specification.

BRIEF DESCRIPTION OF THE DRAWINGS

FIGS. 1A-1E are views illustrating an example of a method for using a combination of the present invention in transfer molding.

FIG. 2 is a schematic view of an example of the laminate structure of a release film constituting the combination of the present invention.

FIGS. 3A-3D are views illustrating an example of a method for using a combination of the present invention in compression molding.

FIGS. 4a-4d are views illustrating the formation of a molded article-side surface layer.

FIGS. 5a-5c are views illustrating the observation results by a laser marker.

DETAILED DESCRIPTION OF THE EMBODIMENTS

Embodiments for carrying out the present invention will now be described in detail. Embodiments described below are merely examples of typical embodiments of the present invention, and the present invention is not limited to these embodiments.

1. Combination of Mold and Release Film

The present invention relates to a combination of a mold used for curing a thermosetting resin and a release film placed between the thermosetting resin and the mold during the curing. The release film comprises a base layer formed of a thermoplastic resin and a surface layer which is laminated to the face which is placed during the curing on the side of the thermosetting resin among the two faces of the base layer, and the surface layer is formed of a particle-containing fluororesin. The mold has an irregularity formed on the face that is to be brought into contact with the release film during the curing.

By using the combination in a molding technique such as transfer molding and compression molding, the state of the surface of a molded article can be conditioned, and for example a desired glossiness can be imparted to the molded article. For example, a combination according to the present invention may be used for manufacturing a molded article having a surface whose glossiness at an incidence angle of 60 degrees is 3 to 50. For example, a combination according to the present invention can be used for manufacturing a molded article having a surface (particularly an epoxy resin surface) whose glossiness at an incidence angle of 60 degrees is 3 to 15, preferably 3 to 10, more preferably 4 to 8, and further preferably 4 to 6.

Also, by using the combination, for example the visibility or the readability of the engraved letters or patterns formed on a molded article surface can be improved. For example, a combination according to the present invention may be used for manufacturing a molded article having a surface (particularly an epoxy resin surface) to be engraved by a laser marker. The height of the engraved letters may for example be 0.1 mm to 10 mm, and preferably 0.2 mm to 5 mm. The height of the engraved letters may be especially 0.5 mm to 3 mm. By using a combination of the present invention, the visibility or the readability of such tiny letters on the surface of a manufactured molded article can be improve.

The release film is suitable for reflecting the irregularity of the surface of the mold on the surface of a molded article, and also exerts excellent release properties. Especially, the combination of the particle and the fluororesin contained in the surface layer contributes to exertion of the excellent release properties and also contributes to conditioning of the state of the surface of the molded article.

Examples of methods for using the combination will now be described and the release films and the molds as constituents of the combination will then be described in more detail.

1-1. Method for Using Combination of Present Invention

A combination of the present invention may for example be used in various methods for molding thermosetting resins. Preferably, a combination of the present invention may be used for forming an irregularity on the surface on a cured product of the thermosetting resin.

For example, the molding technique is transfer molding or compression molding for example, and a combination of the present invention is suitable especially for using in these molding methods. Especially, a combination of the present invention may be used for conditioning the state of the surface of a molded article obtained by these molding methods, preferably for forming an irregularity on the surface of such molded article.

Examples of a method for using a combination of the present invention in such molding method will now be described.

(1) Transfer Molding

FIGS. 1A-1E are views illustrating an example of a method for using a combination of the present invention in transfer molding. As shown in FIG. 1A, a release film 11 constituting the combination of the present invention is placed between an upper mold 12 and a substrate 14-loaded lower mold 13 which constitute the combination of the present invention. On the substrate 14, a semiconductor device 17 may for example be loaded. The upper mold 12 and the lower mold 13 are used for molding a thermosetting resin 15. As a result of the molding, the semiconductor device 17 is sealed by a cured product of the thermosetting resin 15. While a single semiconductor device 17 is shown in FIG. 1, the number of semiconductor devices 17 sealed in one molding time is not limited to one, and is preferably plural.

The release film 11 has a laminate structure shown for example in FIG. 2. The release film 11 includes a base layer 101, a surface layer 102 laminated on one face of the base layer 101 and a surface layer 103 laminated on the other face. The details of the release film 11 will later be described in "1-2. Release film".

The surface layer 102 is laminated to the face which is placed during the transfer molding on the side of the thermosetting resin among the two faces of the base layer 101. In other words, the surface layer 102 is brought into contact with the thermosetting resin 15 during the transfer molding. The surface layer 102 is formed of a fluororesin containing particles.

The surface layer 103 is laminated to the face which is placed during the transfer molding on the side of the upper mold 12 among the two faces of the base layer 101. In other words, the surface layer 103 is brought into contact with the upper mold 12 during the transfer molding.

On the surface 16 of the upper mold 12, an irregularity is formed. In other words, the surface 16 is brought into contact with the release film 11 (particularly the surface layer 103 thereof) during the transfer molding.

Next, as shown in FIG. 1B, while the release film 11 (particularly the surface layer 103 thereof) is attached onto the surface 16 of the upper mold 12, the upper mold 12 is brought into contact with the substrate 14 and the lower mold 13.

Next, as shown in FIG. 1C, the thermosetting resin 15 is introduced between the upper mold 12 (particularly, release film 11) and the substrate 14, and then the thermosetting resin 15 is cured by heating.

During the curing, an irregularity shape formed on the surface 16 of the upper mold 12 is reflected on the surface of the thermosetting resin 15 via the release film 11, and the surface shape of the release film 11 (particularly, the surface shape attributable to particles contained in the surface layer 102) is reflected on the surface of the thermosetting resin 15. In other words, the irregularity shape formed on the surface 16 of the upper mold 12 is reflected indirectly on the surface of the thermosetting resin 15, and the surface shape of the release film 11 (particularly, the surface shape attributable to particles contained in the surface layer 102) is reflected directly on the surface of the thermosetting resin 15. While the irregularity shape and the surface shape are reflected on the surface of the thermosetting resin 15, the thermosetting resin 15 is cured. In other words, on the surface of a molded article obtained as a result of the curing, the irregular shape and the surface shape are reflected. Here, the irregularity formed on the surface of the molded article (cured product) may be different from the irregularity of the mold.

As discussed above, according to the combination of the present invention, it becomes possible to condition the state of the surface of a molded article.

After curing, as shown in FIG. 1D, the upper mold 12 is released from the substrate 14. The release film 11 has excellent release properties especially because it is formed of a fluororesin containing particles. Accordingly, it is released smoothly in a step of FIG. 1D from the cured resin 15. If having insufficient release properties, the release film 19 might adhere to the cured resin 15 for example as shown in FIG. 1E.

(2) Compression Molding

FIGS. 3A-3D are views illustrating an example of a method for using a combination of the present invention in compression molding. As shown in FIG. 3A, a release film 11 constituting the combination of the present invention is placed between an upper mold 22 having a plural semiconductor devices 27-loaded substrate 24 and a lower mold 23.

The release film 11 includes, as described above in (1), a base layer 101, a surface layer 102 laminated on one face of the base layer 101 and a surface layer 103 laminated on the other face.

The surface layer 102 is laminated to the face which is placed during the compression molding on the side of the thermosetting resin among the two faces of the base layer. In other words, the surface layer 102 is brought into contact with the thermosetting resin 25 described below during the compression molding.

The surface layer 103 is laminated to the face which is placed during the compression molding on the side of the lower mold 23 among the two faces of the base layer 101. In other words, the surface layer 103 is brought into contact with the lower mold 23 during the compression molding.

On the surface 26 of the lower mold 23, an irregularity is formed. In other words, the surface 26 is brought into contact with the release film 11 (particularly the surface layer 103 thereof) during the compression molding.

Next, as shown in FIG. 3B, while the release film 11 is attached to the surface 26 of the lower mold 23, the thermosetting resin 25 is placed in a hollow of the lower mold 23.

Next, as shown in FIG. 3C, by moving the upper mold 22, the substrate 24 is brought into contact with the thermosetting resin 25. Then, the thermosetting resin 25 is cured by heating.

During the curing, an irregularity shape formed on the surface 26 of the lower mold 23 is reflected on the surface of the thermosetting resin 25 via the release film 11, and the surface shape of the release film 11 (particularly, the surface shape attributable to particles contained in the surface layer 102) is reflected on the surface of the thermosetting resin 25. In other words, the irregularity shape formed on the surface 26 of the lower mold 23 is reflected indirectly on the surface of the thermosetting resin 25, and the surface shape of the release film 11 (particularly, the surface shape attributable to particles contained in the surface layer 102) is reflected directly on the surface of the thermosetting resin 25. While the irregularity shape and the surface shape are reflected on the surface of the thermosetting resin 25, the thermosetting resin 25 is cured. In other words, on the surface of a molded article obtained as a result of the curing, the irregularity shape and the surface shape are reflected. Here, the irregularity formed on the surface of the molded article (cured product) may be different from the irregularity of the mold.

As discussed above, according to the combination of the present invention, it becomes possible to condition the state of the surface of a molded article.

After curing, as shown in FIG. 3D, the upper mold 22 is released from the lower mold 23. The release film 11 has excellent release properties especially because its surface layer 102 is formed of a fluororesin containing particles. Accordingly, the cured resin 25 can be released smoothly in a step of FIG. 3D from the lower mold 23.

As discussed above, a combination of the present invention is used for curing a thermosetting resin. Especially, a combination of the present invention may be employed for obtaining a molded article by curing a thermosetting resin. The thermosetting resin is for example an epoxy resin or a silicone resin, and preferably epoxy resin. A combination of the present invention is suitable especially for conditioning the state of the surface of these resins.

The molding temperature during the molding using a combination of the present invention may be appropriately selected depending on the type of a thermosetting resin. The molding temperature may for example be 100° C. to 250° C., preferably 120° C. to 200° C., and more preferably 150° C. to 200° C.

1-2. Release Film

A release film constituting a combination of the present invention is described with reference to FIG. 2. FIG. 2 is a schematic view of an example of the laminate structure of a release film as described above.

The release film 11 shown in FIG. 2 includes a base layer 101 and a surface layer 102 laminated to the face which is placed during the curing on the side of the thermosetting resin (molded article side) among the two faces of the base layer 101 (herein referred to also as "molded article-side surface layer"). The base layer 101 is formed of a thermoplastic resin. The molded article-side surface layer 102 is formed of a fluororesin containing particles. Inclusion of the base layer 101 and the molded article-side surface layer 102 in the release film 11 contributes to achievement of the surface conditioning as described above in "1-1. Method for using combination of the present invention". The molded article-side surface layer 102 is released easily from the cured molded article because it is formed of a fluororesin containing particles.

The release film 11 also includes a surface layer 103 laminated to the face which is placed during the curing on the side of the mold among the two faces of the base layer 101 (hereinafter, the surface layer 103 is referred to also as "mold-side surface layer"). The mold-side surface layer 103 may be formed preferably of a fluororesin and may be formed more preferably of a fluororesin containing particles. As a result, the release film 11 becomes to be released easily from the mold after curing of the thermosetting resin.

As discussed above, a release film 11 has a laminate structure in which a molded article-side surface layer 102, a base layer 101 and a mold-side surface layer 103 are laminated in this order. Each layer will now be described in more detail.

[Base Layer]

The base layer 101 is formed of a thermoplastic resin. The thermoplastic resin may be a resin having a melting point which is preferably a molding temperature employed in the curing of the thermosetting resin described above or higher, and more preferably a melting point higher than the molding temperature. As a result, an irregularity on the surface of the mold is reflected more easily on the surface of the thermosetting resin via the release film 11 during the molding described above.

The thermoplastic resin is preferably a polyester-based resin. The polyester-based resin is a macromolecule having ester bonds in the backbone chain. The polyester-based resin may be for example a polymerized product of a polyhydric alcohol with a polybasic acid. The polyester-based resin is a resin whose main component is a polyester, and may contain a polyester in an amount, based on the mass of the resin, for example of 90% by mass or more, preferably 95% by mass or more, and preferably 98% by mass or more.

The thermoplastic resin may be any single one or a mixture of two or more selected from polyethylene terephthalate (PET) resin, polybutylene terephthalate (PBT) resin, polyethylene naphthalate (PEN) resin, polybutylene naphthalate (PBN), and polycarbonate (PC) resin. The thermoplastic resin is more preferably a PET resin or a PEN resin, and especially preferably a PET resin. PET resin is suitable especially for reflecting the irregularity of the surface of the mold on the surface of the thermosetting resin during the molding described above.

The PET resin may be a conventional PET resin or may be an easily moldable PET resin. The glass transition temperature of the conventional PET resin may be 100° C. or more. As used herein, the glass transition temperature is a glass transition temperature determined by differential thermal analysis (DTA). The easily moldable PET resin may have a glass transition temperature which is less than 100° C., preferably 60° C. to 95° C., and more preferably 65° C. to 90° C. The easily moldable PET resin is suitable especially for preventing contamination of a mold or a molded article attributable to oligomers contained in a PET resin.

A base layer formed of the conventional PET resin may be for example, but is not limited to, a film of Tetoron (registered trademark).

The easily moldable PET resin may be a polyethylene terephthalate copolymer resin, for example. The polyethylene terephthalate copolymer may be produced, for example, by reaction of terephthalic acid, ethylene glycol, and a copolymer component, or by mixing and melting polyethylene terephthalate and a polymer of a copolymer component and then performing distribution reaction.

The copolymer component may be an acid component or may be an alcohol component, for example. Examples of the acid component include aromatic dibasic acids (such as isophthalic acid, phthalic acid, and naphthalenedicarboxylic acid), aliphatic dicarboxylic acids (such as adipic acid, azelaic acid, sebacic acid, and decanedicarboxylic acid), and alicyclic dicarboxylic acids (such as cyclohexanedicarboxylic acid). Examples of the alcohol component include aliphatic diols (such as butanediol, hexanediol, neopentyl glycol, and hexanediol) and alicyclic diols (such as cyclohexanedimethanol). As the copolymer component, these compounds may be used singly or in combination of two or more of them. The acid component may specifically be isophthalic acid and/or sebacic acid.

As the base layer formed of an easily moldable PET resin, a commercially available product may be used. For example, as a base layer formed of an easily moldable PET resin, TEFLEX (trademark) FT, TEFLEX (trademark) FT3, and TEFLEX (trademark) FW2 (each manufactured by Teijin Film Solutions Ltd.) may be used. Also, as a base layer formed of an easily moldable PET resin, EMBLET CTK-38 (manufactured by Unitika Ltd.) may also be used. Also as a base layer, CH285J (manufactured by Nan Ya Plastics Corporation) may be used.

The base layer formed of the easily moldable PET resin may be manufactured by a method described, for example, in JP-A No. Hei-2-305827, JP-A No. Hei-3-86729, or JP-A No. Hei-3-110124. According to a preferred embodiment of the present invention, the base layer may be manufactured by biaxial stretching of an easily moldable PET resin so as to preferably have a plane orientation coefficient of 0.06 to 0.16, and more preferably 0.07 to 0.15, as described in any of the above published documents.

The tensile breaking strength of the base layer, as determined at 175° C. in accordance with JIS K7127, may be preferably 40 MPa to 200 MPa, more preferably 40 MPa to 120 MPa, even more preferably 40 MPa to 110 MPa, and particularly preferably 45 MPa to 100 MPa.

The tensile elongation at break of the base layer, as determined at 175° C. in accordance with JIS K7127, may be preferably 200% to 500%, more preferably 250% to 450%, and even more preferably 300% to 400%.

The thickness of the base layer may, for example, be 10 μm to 80 μm, preferably 15 μm to 75 μm, more preferably 20 μm to 70 μm, and especially preferably 30 μm to 60 μm. Such a thickness is suitable for allowing the irregularity shape of a mold surface to be reflected on the molded article surface.

[Molded Article-Side Surface Layer]

A molded article-side surface layer 102 is formed of a fluororesin containing particles. According to a preferred embodiment of the present invention, the fluororesin contains no chlorine. Containing no chlorine improves the durability and/or the antifouling properties of the layer. The fluororesin may, for example, be a cured product of a fluororesin composition containing a reactive functional group-containing fluoropolymer and a curing agent.

The fluororesin preferably contains a tetrafluoroethylene resin and more preferably contains a tetrafluoroethylene resin as a main component. In the present description, the tetrafluoroethylene resin is a component produced by curing reaction of a reactive functional group-containing tetrafluoroethylene polymer described below with a curing agent. A tetrafluoroethylene resin being a main component means that the fluororesin is composed only of a tetrafluoroethylene resin or the content of a tetrafluoroethylene resin is the highest among the components of the fluororesin. For example, the content of a tetrafluoroethylene resin in the fluororesin may, for example, be 70% by mass or more, preferably 75% by mass or more, more preferably 80% by mass or more, and particularly preferably 85% by mass or more, relative to the total mass of the fluororesin. The content may, for example, be 99% by mass or less, particularly 98% by mass or less, and more particularly 97% by mass or less, relative to the total mass of the fluororesin.

The reactive functional group-containing fluoropolymer contained in the fluororesin composition may be a fluoropolymer that is curable by the curing agent. The reactive functional group and the curing agent may be appropriately selected by a person skilled in the art.

The reactive functional group may, for example, be a hydroxy group, a carboxyl group, the group represented by —COOCO—, an amino group, or a silyl group and is preferably a hydroxy group. Such groups allow a reaction for giving the cured product to satisfactory proceed.

Of these reactive functional groups, a hydroxy group is particularly suitable to the reaction for giving the cured product. In other words, the reactive functional group-containing fluoropolymer may preferably be a hydroxy group-containing fluoropolymer and more preferably a hydroxy group-containing tetrafluoroethylene polymer.

The fluorine-containing unit of the reactive functional group-containing fluoropolymer is preferably a fluorine-containing unit based on a perfluoroolefin. The fluorine-containing unit based on the perfluoroolefin may more preferably be based on one, two, or three selected from tetrafluoroethylene (tetrafluoroethylene, also referred to as "TFE" in the present description), hexafluoropropylene (HFP), and perfluoro (alkyl vinyl ethers) (PAVEs). Preferably, of the fluorine-containing units based on the perfluoroolefin, the amount of a fluorine-containing unit based on TFE is the largest.

The hydroxy value of the reactive functional group-containing fluoropolymer (particularly the hydroxy value of the hydroxy group-containing fluoropolymer) may preferably be 10 mg KOH/g to 300 mg KOH/g, more preferably 10 mg KOH/g to 200 mg KOH/g, and even more preferably 10 mg KOH/g to 150 mg KOH/g. The reactive functional group-containing fluoropolymer having a hydroxy value not less than the lower limit of the above numerical range may make the resin composition have good curing properties. The reactive functional group-containing fluoropolymer having a hydroxy value not more than the upper limit of the above numerical range may contribute to making the resin composition give a cured product suitable for multiple molding operations. The hydroxy value is determined by a method in accordance with JIS K 0070.

The acid value of the reactive functional group-containing fluoropolymer (particularly the acid value of the hydroxy group-containing fluoropolymer) may preferably be 0.5 mg KOH/g to 100 mg KOH/g and more preferably 0.5 mg KOH/g to 50 mg KOH/g.

The reactive functional group of the reactive functional group-containing fluoropolymer may be introduced into the fluoropolymer by copolymerization of a monomer having the reactive functional group with a fluorine-containing monomer (particularly the above perfluoroolefin). In other words, the reactive functional group-containing fluoropolymer may contain a polymer unit based on a reactive functional group-containing monomer and a polymer unit based on a fluorine-containing monomer (particularly the above perfluoroolefin).

When the reactive functional group is a hydroxy group, the monomer having the reactive functional group may preferably be a hydroxy group-containing vinyl ether or a hydroxy group-containing allyl ether. Examples of the hydroxy group-containing vinyl ether include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether, and examples of the hydroxy group-containing allyl ether include 2-hydroxyethyl allyl ether, 4-hydroxybutyl allyl ether, and glycerol monoallyl ether. Alternatively, the monomer having the reactive functional group may, for example, be a hydroxyalkyl ester of (meth)acrylic acid such as 2-hydroxyethyl acrylate and 2-hydroxyethyl methacrylate. As the monomer having the reactive functional group, these compounds may be used singly or in combination of two or more of them. When the reactive functional group is a hydroxy group, the monomer having the reactive functional group may more preferably be a hydroxy group-containing vinyl ether and specifically preferably 4-hydroxybutyl vinyl ether and/or 2-hydroxyethyl vinyl ether from the viewpoint of curing properties of the resin composition.

When the reactive functional group is a carboxyl group, the monomer having the reactive functional group may preferably be an unsaturated carboxylic acid, an ester of an unsaturated carboxylic acid, or an acid anhydride of an unsaturated carboxylic acid.

When the reactive functional group is an amino group, the monomer having the reactive functional group may, for example, be an amino vinyl ether or allylamine.

When the reactive functional group is a silyl group, the monomer having the reactive functional group may preferably be a silicone vinyl monomer.

The fluorine-containing monomer is preferably a perfluoroolefin. Examples of the perfluoroolefin include tetrafluoroethylene (TFE), hexafluoropropylene (HFP), and perfluoro (alkyl vinyl ethers) (PAVEs). Preferably, the fluorine-containing monomer comprises TFE.

Preferably, the reactive functional group-containing fluoropolymer may contain, in addition to the polymer unit based on a reactive functional group-containing monomer and the polymer unit based on a fluorine-containing monomer, a polymer unit based on a fluorine-free vinyl monomer. The fluorine-free vinyl monomer may, for example, be a single monomer or a combination of two or more monomers selected from vinyl carboxylates, alkyl vinyl ethers, and non-fluorinated olefins.

Examples of the vinyl carboxylate include vinyl acetate, vinyl propionate, vinyl butyrate, vinyl isobutyrate, vinyl pivalate, vinyl caproate, vinyl versatate, vinyl laurate, vinyl stearate, vinyl cyclohexyl carboxylate, vinyl benzoate, and vinyl para-t-butylbenzoate.

Examples of the alkyl vinyl ether include methyl vinyl ether, ethyl vinyl ether, butyl vinyl ether, and cyclohexyl vinyl ether.

Examples of the non-fluorinated olefin include ethylene, propylene, n-butene, and isobutene.

The reactive functional group-containing fluoropolymer may contain, in addition to the polymer unit based on a reactive functional group-containing monomer and the polymer unit based on a fluorine-containing monomer as a perfluoroolefin, a polymer unit based on a fluoromonomer other than the perfluoroolefin, such as vinylidene fluoride (VdF), chlorotrifluoroethylene (CTFE), vinyl fluoride (VF), and fluorovinyl ether.

The reactive functional group-containing fluoropolymer may, for example, be a TFE/non-fluorinated olefin/hydroxybutyl vinyl ether copolymer, a TFE/vinyl carboxylate/hydroxybutyl vinyl ether copolymer, or a TFE/alkyl vinyl ether/hydroxybutyl vinyl ether copolymer.

More specifically, the reactive functional group-containing fluoropolymer may be a TFE/isobutylene/hydroxybutyl vinyl ether copolymer, a TFE/vinyl versatate/hydroxybutyl vinyl ether copolymer, or a TFE/VdF/hydroxybutyl vinyl ether copolymer. The reactive functional group-containing fluoropolymer may be particularly preferably a TFE/isobutylene/hydroxybutyl vinyl ether copolymer or a TFE/vinyl versatate/hydroxybutyl vinyl ether copolymer.

As the reactive functional group-containing fluoropolymer, for example, a product in a Zeffle GK series may be used.

The curing agent contained in the fluororesin composition may be appropriately selected by a person skilled in the art depending on the type of a reactive functional group contained in the reactive functional group-containing fluoropolymer.

When the reactive functional group is a hydroxy group, the curing agent may be preferably a single agent or a combination of two or more agents selected from isocyanate curing agents, melamine resins, silicate compounds, and isocyanate group-containing silane compounds.

When the reactive functional group is a carboxyl group, the curing agent may be preferably a single agent or a combination of two or more agents selected from amino curing agents and epoxy curing agents.

When the reactive functional group is an amino group, the curing agent may be a single agent or a combination of two or more agents selected from carbonyl group-containing curing agents, epoxy curing agents, and acid anhydride curing agents.

The content of the curing agent in the fluororesin composition may, for example, be 15 parts by mass to 50 parts by mass, preferably 20 parts by mass to 40 parts by mass, and more preferably 23 parts by mass to 35 parts by mass relative to 100 parts by mass of the reactive functional group-containing fluoropolymer. These numerical ranges also apply to the content of the curing agent in a cured product of the fluororesin composition.

The content of the curing agent may be determined by pyrolysis gas chromatography (Py-GC/MS).

In an embodiment of the present invention, the reactive functional group contained in the reactive functional group-containing fluoropolymer may be a hydroxy group, and the curing agent may be an isocyanate curing agent. In the embodiment, the isocyanate curing agent is preferably a hexamethylene diisocyanate (HDI) polyisocyanate.

The content of the HDI polyisocyanate in the fluororesin composition may, for example, be 15 parts by mass to 50 parts by mass, preferably 20 parts by mass to 40 parts by mass, and more preferably 23 parts by mass to 35 parts by mass relative to 100 parts by mass of the reactive functional group-containing fluoropolymer. These numerical ranges also apply to the content of the HDI polyisocyanate in a cured product of the fluororesin composition.

As the HDI polyisocyanate, for example, a single polyisocyanate or a combination of two or more polyisocyanates selected from isocyanurate-type polyisocyanates, adduct-type polyisocyanates, and biuret-type polyisocyanates may be used. In the present invention, the isocyanate curing agent may be preferably an isocyanurate-type polyisocyanate and/or an adduct-type polyisocyanate and more preferably a combination of an isocyanurate-type polyisocyanate and an adduct-type polyisocyanate.

When a combination of an isocyanurate-type polyisocyanate and an adduct-type polyisocyanate is used as the curing agent, the mass ratio thereof is, for example, 10:6 to 10:10 and preferably 10:7 to 10:9. The total amount thereof may, for example, be 15 parts by mass to 50 parts by mass, preferably 20 parts by mass to 40 parts by mass, and more preferably 25 parts by mass to 35 parts by mass relative to 100 parts by mass of the reactive functional group-containing fluoropolymer.

The content ratio of these curing agents may be determined by pyrolysis gas chromatography (Py-GC/MS).

The fluororesin that forms the molded article-side surface layer contains particles, preferably contains particles having an average particle size of 1 μm to 10 μm, and more preferably 2 μm to 9 μm, as determined by laser diffraction particle size analysis. The average particle size is a volume average diameter weighted by volume and is determined in accordance with JIS Z8825. Inclusion of the particles allows the shape attributable to the particles to be reflected on the molded article surface, and also improves the release properties of the release film. When the average particle size of the particles is smaller than the lower limit of the numerical range described above, it may become impossible to allow the surface shape attributable to the particles to be reflected on the molded article surface. When the average particle size of the particles is larger than the higher limit of the numerical range described above, it may be possible that the release properties are decreased or the particles fall down from the fluororesin. When the average particle size of the particles is larger than the higher limit of the numerical range described above, it may also be possible that a streak is formed for example when applying the fluororesin on the base layer and it may become difficult to manufacture a release film.

The particles are preferably inorganic particles or organic particles. Examples of the inorganic particles include particles of silicon dioxide (particularly amorphous silicon dioxide), calcium carbonate, magnesium carbonate, calcium phosphate, kaolin, talc, aluminum oxide, titanium oxide, alumina, barium sulfate, calcium fluoride, lithium fluoride, zeolite, and molybdenum sulfide. Examples of the organic particles include cross-linked polymer particles and calcium oxalate particles. In the present invention, the particles are preferably inorganic particles, more preferably silicon dioxide particles, and even more preferably amorphous silicon dioxide particles. The amorphous silicon dioxide may be a sol-gel type silica. As the amorphous silicon dioxide, for example, an amorphous silicon dioxide in a Sylysia series may be used.

The content of the particles in the fluororesin composition may, for example, be 1 parts by mass to 30 parts by mass, preferably 2 parts by mass to 25 parts by mass, and more preferably 3 parts by mass to 20 parts by mass relative to 100 parts by mass of the reactive functional group-containing fluoropolymer. These numerical ranges also apply to the content of the particles in a cured product of the fluororesin composition. A content within the numerical range described above contribute to allowing the shape attributable to the particles to be reflected on the molded article, and/or contributes to improve the release properties of the release film.

According to one preferred embodiment of the present invention, the content of the particles in the fluororesin composition, relative to 100 parts by mass of the reactive functional group-containing fluoropolymer, may for example be 1 part by mass to 17 parts by mass, preferably 2 parts by mass to 16 parts by mass, especially preferably 3 parts by mass to 10 parts by mass. These numerical ranges also apply to the content of the particles in a cured product of the fluororesin composition. A content within the numerical range described above can improve the visibility or readability of engraved letters or patterns made on the molded article surface by a laser marker.

The content of the particles may be determined by thermogravimetric analysis (TGA).

The fluororesin composition may contain a solvent. The solvent type may be appropriately selected by a person skilled in the art. Examples of the solvent include butyl acetate, ethyl acetate, and methyl ethyl ketone (also referred to as MEK). For example, a mixture of these three solvents may be used as the solvent. This mixture is suitable for preparing the fluororesin composition.

The fluororesin composition may contain a release accelerator. Examples of the release accelerator include an amino modified-methylpolysiloxane, an epoxy modified-methylpolysiloxane, a carboxy modified-methylpolysiloxane, and a carbinol modified-methylpolysiloxane. Preferably, the release accelerator is an amino modified-methylpolysiloxane.

The content of the release accelerator may, for example, be 0.01 parts by mass to 3 parts by mass, preferably 0.05 parts by mass to 2 parts by mass, and more preferably 0.1 parts by mass to 1 parts by mass relative to 100 parts by mass of the reactive functional group-containing fluoropolymer. These numerical ranges also apply to the content of the release accelerator in a cured product of the fluorine resin composition.

The thickness of the molded article-side surface layer may, for example, be 1 μm to 10 μm, preferably 2 to 9 μm, and more preferably 3 μm to 8 μm.

The fluororesin composition may be manufactured by mixing and stirring the above-described components by means known by a person skilled in the art. For the mixing and stirring, for example, a mixer such as a high-speed mixer, a homomixer, and a paint shaker may be used. For the mixing and stirring, for example, a dissolver such as an edge-turbine high-speed dissolver may also be used.

A cured product of the fluororesin composition may be obtained as follows: the fluororesin composition is applied onto the surface of the base layer, and is heated, for example, at 100° C. to 200° C., preferably at 120° C. to 180° C., for example, for 10 seconds to 240 seconds, preferably for 30 seconds to 120 seconds. The cured product forms the surface layer. The application amount of the fluororesin composition may be appropriately set by a person skilled in the art depending on the thickness of a surface layer to be formed.

The shape of a molded article-side surface layer will be described with reference to FIGS. 4a-4d. A fluororesin composition which forms a molded article-side surface layer is provided on the base layer. The resin composition, immediately after being provided, is in a liquid state as shown in FIG. 4a, and the particles exist in the composition. By heating the resin composition as described above, a solvent in the composition is evaporated and the state shown in FIG. 4b is established thereby allowing a shape attributable to the particles to emerge. Finally, the cured product of the composition acquires the state of the surface as shown in FIG. 4c, and, in other words, an irregularity shape attributable to the particles emerges. As shown in the schematic view of FIG. 4d, the release film has a molded article-side surface layer 402, which has the irregularity attributable to the particles, on the base layer 401. As discussed above, the release film constituting a combination of the present invention has the molded article-side surface layer on which the irregularity attributable to the particles are formed.

[Mold-Side Surface Layer]

A mold-side surface layer 103 may be also formed of a fluororesin containing particles. According to a preferred embodiment of the present invention, the fluororesin contains no chlorine. The fluororesin preferably contains tetrafluoroethylene resin, and more preferably contains a tetrafluoroethylene resin as a main component. The fluororesin may for example be a cured product of a fluororesin composition containing a reactive functional group-containing fluoropolymer and a curing agent.

Since the explanation with regard to the reactive functional group-containing fluoropolymer contained in the molded article-side surface layer 102 described above applies entirely to the reactive functional group-containing fluoropolymer contained in the fluororesin composition, the explanation with regard to the reactive functional group-containing fluoropolymer is omitted.

Also since the explanation with regard to the type and the content of the curing agent contained in the molded article-side surface layer 102 described above applies to the curing agent contained in the fluororesin composition, the explanation with regard to the reactive functional group-containing fluoropolymer is omitted.

The fluororesin that forms the mold-side surface layer contains particles, and preferably contains particles having an average particle size of 1 μm to 10 μm, and more preferably 2 μm to 9 μm, as determined by laser diffraction particle size analysis. The average particle size is a volume average diameter weighted by volume and is determined in accordance with JIS Z8825. Inclusion of the particles improves the release properties of the release film. When the average particle size of the particles is larger than the higher limit of the numerical range described above, it may be possible that the release properties are decreased or the particles fall down from the fluororesin. When the average particle size of the particles is larger than the higher limit of the numerical range described above, it may be also possible that a streak is formed for example when applying the fluororesin on the base layer and it may become difficult to manufacture a release film.

The particles are preferably inorganic particles or organic particles. Examples of the inorganic particles include particles of silicon dioxide (particularly amorphous silicon dioxide), calcium carbonate, magnesium carbonate, calcium phosphate, kaolin, talc, aluminum oxide, titanium oxide, alumina, barium sulfate, calcium fluoride, lithium fluoride, zeolite, and molybdenum sulfide. Examples of the organic particles include cross-linked polymer particles and calcium oxalate particles. In the present invention, the particles are preferably inorganic particles, more preferably silicon dioxide particles, and even more preferably amorphous silicon dioxide particles. The amorphous silicon dioxide may be a sol-gel type silica. As the amorphous silicon dioxide, for example, an amorphous silicon dioxide in a Sylysia series may be used.

The content of the particles in the fluororesin composition may, for example, be 3 parts by mass to 30 parts by mass, preferably 5 parts by mass to 25 parts by mass, and more preferably 10 parts by mass to 20 parts by mass relative to 100 parts by mass of the reactive functional group-containing fluoropolymer. These numerical ranges apply also to the content of the particles in a cured product of the fluorine resin composition. The content within the numerical range described above contributes to the improvement of the release properties of the release film.

The content of the particles may be determined by thermogravimetric analysis (TGA).

The fluororesin composition may contain a solvent. The solvent type may be appropriately selected by a person skilled in the art. Examples of the solvent include butyl acetate, ethyl acetate, and methyl ethyl ketone (also referred to as MEK). For example, a mixture of these three solvents may be used as the solvent. This mixture is suitable for preparing the fluororesin composition.

The fluororesin composition may contain a release accelerator. Examples of the release accelerator include an amino modified-methylpolysiloxane, an epoxy modified-methylpolysiloxane, a carboxy modified-methylpolysiloxane, and a carbinol modified-methylpolysiloxane. Preferably, the release accelerator is an amino modified-methylpolysiloxane.

The content of the release accelerator may, for example, be 0.01 parts by mass to 3 parts by mass, preferably 0.05 parts by mass to 2 parts by mass, and more preferably 0.1 parts by mass to 1 parts by mass relative to 100 parts by mass of the reactive functional group-containing fluoropolymer. These numerical ranges also apply to the content of the release accelerator in a cured product of the fluorine resin composition.

Preferably, the fluororesin composition used for forming a mold-side surface layer contains no release accelerator.

The thickness of the mold-side surface layer may for example be 1 μm to 10 μm, preferably 2 to 9 μm, and more preferably 3 μm to 8 μm.

Since the explanation with regard to the method of manufacturing a fluororesin composition used for forming the molded article-side surface layer 102 applies entirely to the method of manufacturing the fluororesin composition, the explanation with regard to the manufacturing method is omitted.

In a preferred embodiment of the present technique, the molded article-side surface layer comprises a cured product of a fluororesin composition comprising the reactive functional group-containing fluoropolymer (particularly hydroxy group-containing tetrafluoroethylene polymer), the curing agent, the particle and the release accelerator. The mold-side surface layer comprises a cured product of a fluororesin composition comprising the reactive functional group-containing fluoropolymer (particularly hydroxy group-containing tetrafluoroethylene polymer), the curing agent, and the particle.

More preferably, the molded article-side surface layer comprises a cured product of a fluororesin composition containing a hydroxy group-containing tetrafluoroethylene polymer, an HDI polyisocyanate, silicon dioxide particles and amino modified-methylpolysiloxane. The mold-side surface layer comprises a cured product of a fluororesin composition containing a hydroxy group-containing tetrafluoroethylene polymer, an HDI polyisocyanate and silicon dioxide particles.

Such two surface layers included in the release film particularly contribute to allowing the state of the surface of a molded article according to the combination of the present invention to be conditioned and/or improving the release properties of a release film.

[Features of Release Film]

According to a preferred embodiment of the present invention, the tensile breaking strength of the release film may be 40 MPa to 200 MPa, more preferably 40 MPa to 120 MPa, even more preferably 40 MPa to 110 MPa, and particularly preferably 45 MPa to 100 MPa, as determined at 175° C. in accordance with JIS K7127, and the tensile elongation at break of the release film may be 200% to 500%, more preferably 250% to 450%, and even more preferably 300% to 400%, as determined at 175° C. in accordance with JIS K7127.

A tensile breaking strength and a tensile elongation at break of the release film each within the above numerical ranges are suitable for conditioning the surface shape according to the combination of the present invention.

The gas ($O_2$) permeability of the release film may, for example, be 5,000 to 50,000 cc/m$^2$·24 hr·atm, particularly 5,000 to 30,000 cc/m$^2$·24 hr·atm, and more particularly 5,000 to 20,000 cc/m$^2$·24 hr·atm or less, as determined at 175° C. in accordance with JIS K7126-1. The release film has such low gas permeability. Hence, when molding is performed with the release film, mold contamination by gas generated from a resin can be suppressed.

The thickness of the release film may, for example, be 30 μm to 100 μm, preferably 35 μm to 90 μm, and more preferably 40 μm to 80 μm. A thickness of the release film within the above numerical range allows the irregularity shape of a mold surface to be reflected on a molded article more easily.

The release film may be used in molding one time or multiple times. The release film may be used for molding, for example, two or more times, preferably four or more times, more preferably five or more times, more preferably six or more times, and even more preferably eight or more times. The release film may be used for molding, for example, 2 to 20 times, preferably 4 to 15 times, more preferably 5 to 15 times, more preferably 6 to 15 times, and even more preferably 8 to 12 times. Through multiple release operations, the release film maintains its performance and is unlikely to break. Hence, the release film can be used in multiple molding processes. This can reduce molding costs.

An oligomer is contained in a polyester-based resin (particularly PET resin) and the oligomer may contaminate a mold and/or molded article during molding (particularly when using a release film containing the resin multiple times repetitively for molding). Nevertheless, the release film makes it less likely to contaminate the mold and/or molded article during molding even if the thermoplastic resin forming the base layer is a polyester-based resin. The release film makes it less likely to contaminate the mold and/or molded article even if a same single film is used multiple times repetitively in molding. Such a low contamination feature is considered to be attributable especially to the surface layer formed of a fluororesin.

[Method of Manufacturing Release Film]

A method of manufacturing the release film described above comprises an applying step of applying a fluororesin composition onto two faces of the base layer and a curing step of, after the applying step, curing the fluororesin composition.

The above explanation also applies to the base layer and the fluororesin composition used in the applying step, and the explanation thereof is omitted.

The applying step may be appropriately carried out by a person skilled in the art so as to achieve intended layer thicknesses. For example, the fluororesin composition may be applied onto two faces of the base layer by gravure rolling, reverse rolling, offset gravure coating, kiss coating, reverse kiss coating, wire bar coating, spray coating, or impregnation coating. An apparatus for coating by such methods may be appropriately selected by a person skilled in the art.

The curing step comprises heating the fluororesin composition, for example, at 100° C. to 200° C., preferably at 120° C. to 180° C., for example, for 10 seconds to 240 seconds, preferably for 30 seconds to 120 seconds. By the heating, the fluororesin composition is cured.

1-3. Mold

A mold constituting the combination of the present invention has an irregularity formed on the mold surface which is brought into contact with the release film when the thermosetting resin is cured. The irregularity is reflected on the surface of the thermosetting resin via the release film. Thus, the irregularity is reflected on the surface of the thermosetting resin indirectly. Accordingly, the irregularity formed on the surface of the cured product of the thermosetting resin may be different from the irregularity on the mold.

According to one embodiment of the present invention, the irregularity may be provided on a part of the mold surface which is brought into contact with the release film during the molding. For example, the area covering the part of the molded article surface which should be subjected to the surface conditioning, among the mold surface, may exclusively have the irregularity. As a result, the area of the surface having irregularity among the mold surface can be reduced thereby reducing the mold manufacture cost.

According to another embodiment of the present invention, the irregularity may be given over the entire mold surface which is brought into contact with the release film during the molding.

The surface roughness Ra of the face of the mold, which is brought into contact with the release film during the curing, is preferably 1 µm to 4 µm, more preferably 1.2 µm to 3.8 µm, and especially 1.4 µm to 3.6 µm. A surface roughness of the mold surface having the irregularity within the numerical range described above allows the irregularity to be reflected more easily on the surface of a cured product of the thermosetting resin via the release film. A too small surface roughness makes surface conditioning impossible. A too large surface roughness may lead to difficulty in releasing the release film from the mold, and/or to a rupture of the release film upon molding. A too large surface roughness may also lead to an uneven roughness of the mold surface, by which the appearance of the molded article is affected adversely.

As used herein, the surface roughness Ra is determined in accordance with JIS B0601.

While the irregularity of the mold surface may be formed for example by a technique known in the art such as electrical discharge machining (EDM) or shot blast, it may be formed preferably by electrical discharge machining (EDM). The electrical discharge machining is suitable for forming a face having a surface roughness Ra within the numerical range described above. The electrical discharge machining is suitable especially for imparting such surface roughness described above to a metal surface. The electrical discharge machining may be conducted by technique and apparatus known in the art, and the irregularity may be formed on the mold surface by conducting an electrical discharge machine process while setting the electrical discharge machining apparatus so that a desired irregularity is formed.

A material for the mold may be appropriately selected by a person skilled in the art depending for example of the type of the thermosetting resin and/or the shape of the molded article. The material for the mold may for example be selected from materials used usually in transfer molding or compression molding. The material for the mold may for example be a martensitic stainless steel, more specifically SUS404C. The hardness of the mold may preferably be 50 HRC or more, and more preferably 55 HRC or more. The mold may be manufactured by a technique known in the art and may for example be manufactured by NC cutting.

The mold has preferably been subjected to a surface treatment. The type of the surface treatment may be appropriately selected by a person skilled in the art depending on the material for the mold. When the material for the mold is a martensitic stainless steel, the mold may be subjected for example to a hard chromium plating treatment.

2. Release Film

The present invention also provides a release film used in combination with a mold for curing a thermosetting resin. The release film is a release film constituting the combination of the present invention explained in "1. Combination of mold and release film" described above, and the explanation applies entirely to the release film of the present invention.

By using a release film of the present invention in combination with a mold explained in "1. Combination of mold and release film" described above in curing a thermosetting resin, the state of the surface of a molded article consisting of a cured product of the thermosetting resin can be conditioned. The release film of the present invention is suitable for reflecting the irregularity of the mold surface on the molded article.

The release film of the present invention also has excellent release properties. In spite of the irregularity provided on the part, among the mold surface, which is brought into contact with the release film in the curing described above, the release film is released smoothly from the mold.

3. Mold

The present invention also provides a mold used in combination with a release film for curing a thermosetting resin. The mold is a mold constituting the combination of the present invention explained in "1. Combination of mold and release film" described above, and the explanation applies entirely to the mold of the present invention.

By using a mold of the present invention in combination with a release film explained in "1. Combination of mold and release film" described above in curing a thermosetting resin, the state of the surface of a molded article consisting of a cured product of the thermosetting resin can be conditioned.

4. Method of Manufacturing Molded Article

The present invention provides a method of manufacturing a molded article. The method of manufacturing comprises a placing step for placing a release film in a mold used for curing a thermosetting resin, a curing step, after the placing step, for curing the thermosetting resin, while being in contact with the release film, in the mold, and, a releasing step, after the curing step, for releasing the cured thermosetting resin from the mold thereby obtaining a molded article.

The mold and the release film used in the present manufacturing method are a mold and a release film constituting the combination of the present invention explained in "1.

Combination of mold and release film" described above, and the explanation applies entirely to the manufacturing method of the present invention. The method of manufacturing a molded article may for example be in accordance with, but is not limited to, transfer molding process or compression molding process.

In the placing step, the release film is placed in the mold. In such a manner that molded article-side surface layer of the release film is brought into contact with the thermosetting resin while the mold-side surface layer is brought into contact with the surface of the mold having irregularity thereon, the release film may be placed in the mold. For example, in such a manner that a state shown in FIG. 1A or FIG. 3A explained in "1-1. Method of using combination of the present invention" described above, the release film may be placed in the placing step.

After the placing step, the release film may be pasted to the surface of the mold having irregularity thereon for example by aspiration. Prior to the pasting, the release film may be softened by heating.

During the curing step, the thermosetting resin is cured in the mold.

For example, in transfer molding, a closed space may be formed prior to the curing to prevent leakage of the thermosetting resin from the inside of the mold. For example, as shown in FIG. 1B, the upper mold and the lower mold are closed to form a closed space. Then as shown in FIG. 1C the thermosetting resin is introduced into the closed space and the thermosetting resin may be cured by heating.

For example, in compression molding, the thermosetting resin may be introduced into the mold prior to the curing. For example, as shown in FIG. 3B, the thermosetting resin may be introduced into the hollow of the lower mold. Then as shown in FIG. 3C, the upper mold carrying the semiconductor device-loaded substrate is moved toward the lower mold, and these molds are closed. In the state that these molds are closed, the thermosetting resin is cured by heating.

In the curing step, the irregular shape formed on the mold surface is reflected indirectly on the surface of the thermosetting resin, while the surface shape of the release film (particularly surface shape attributable to the particles contained in the molded article-side surface layer) is reflected directly on the surface of the thermosetting resin. In the state that the irregular shape and the surface shape are reflected on the surface of the thermosetting resin, the thermosetting resin is cured. In other words, on the surface of the molded article obtained as a result of the curing, the irregular shape and the surface shape are reflected. In such a manner, the state of the surface of a molded article is conditioned.

In the releasing step, the thermosetting resin which has been cured (molded article) is released from the mold. For example, from the molded article, the mold having a surface having the irregularity formed thereon is released as shown in FIG. 1D or FIG. 3D.

A method of manufacturing of the present invention may further comprises, after the releasing step, an engraving step using a laser marker for engraving the molded article surface whose state of the surface has been conditioned as described above. A method of manufacturing according to the present invention improves the visibility or readability of the engraved letter made by the laser marker. The height of the engraved letters may for example be 0.1 mm to 10 mm, and preferably 0.2 mm to 5 mm. The height of the engraved letters may be especially 0.5 mm to 3 mm. The surface of a molded article obtained by the method of manufacturing according to the present invention can improve the visibility or readability of such tiny letters.

As a result of the steps described above, a molded article whose state of the surface has been conditioned can be obtained.

The present invention will next be described in more detail with reference to examples. The examples described below are merely typical examples of the present invention, and the scope of the invention is not intended to be limited to these examples.

Example 1: Example of Molded Article Surface Conditioning (1) Release Film Manufacture As described below, two types of the release films were manufactured.

(1-1) Release Film Manufacture

As a base layer, a film formed of a conventional polyethylene terephthalate resin (Tetoron G2CW, Teijin Ltd., thickness 38 μm) was provided.

Next, two fluororesin compositions (hereinafter referred to as first fluororesin composition and second fluororesin composition) to be applied onto the film were prepared. The first fluororesin composition is for forming a mold-side surface layer. The second fluororesin composition is for forming a molded article-side surface layer.

The first fluororesin composition was prepared by mixing and stirring 100 parts by mass of a hydroxy group-containing tetrafluoroethylene polymer composition (Zeffle GK570, Daikin Industries, Ltd., containing 65% by mass of a hydroxy group-containing tetrafluoroethylene polymer), 11.47 parts by mass of an amorphous silicon dioxide (Sylysia 380, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 6.18 parts by mass of butyl acetate, 44.62 parts by mass of ethyl acetate, and 89.25 parts by mass of MEK. The amorphous silicon dioxide had an average particle size (volume average diameter as described above) of 8.8 μm as determined with a particle size analyser (SALD-2200, Shimadzu Corporation) by laser diffraction particle size analysis.

The second fluororesin composition was the same as the first fluororesin composition except that 0.31 parts by mass of an amino modified-methylpolysiloxane (a release accelerator, Shin-Etsu Chemical) was further added to the first fluororesin composition, and that the amount of ethyl acetate was changed to 44.81 parts by mass, and that the amount of MEK was changed to 89.63 parts by mass.

Onto one face of the film, the first fluororesin composition was applied, and onto the other face of the film, the second fluororesin composition was applied. The application was performed with a reverse kiss coating apparatus. After the application, these compositions were cured by heating at 150° C. for 60 seconds, giving a release film in which fluororesin layers were laminated on the corresponding faces of the conventional PET resin film (hereinafter referred to as "release film 1").

The release film 1 had a thickness of 60±5 μm. The base layer in the release film 1 had a thickness of 38 μm±10%. Of the two surface layers in the release film 1, the mold-side surface layer had a thickness of 5.5±0.5 μm and the molded article-side surface layer had a thickness of 5.5±0.5 μm.

The cured product of the first fluororesin composition (mold-side surface layer) contained 17.65 parts by mass of the amorphous silicon dioxide, 15.39 parts by mass of the isocyanurate-type polyisocyanate, and 11.98 parts by mass of the adduct-type polyisocyanate relative to 100 parts by mass of the hydroxy group-containing tetrafluoroethylene polymer.

The cured product of the second fluororesin composition (molded article-side surface layer) contained 17.65 parts by mass of the amorphous silicon dioxide, 15.39 parts by mass of the isocyanurate-type polyisocyanate, 11.98 parts by mass of the adduct-type polyisocyanate, and 0.48 parts by mass of the amino modified-methylpolysiloxane relative to 100 parts by mass of the hydroxy group-containing tetrafluoroethylene polymer.

(1-2) Release Film Manufacture

Except that the composition of the second fluororesin composition described above in (1-1) was changed as shown below, a release film was manufactured by a method similar to that in (1-1) described above (hereinafter referred to as "release film 2").

In other words, the second fluororesin composition was prepared by mixing and stirring 100 parts by mass of a hydroxy group-containing tetrafluoroethylene polymer composition (Zeffle GK570, Daikin Industries, Ltd., containing 65% by mass of a hydroxy group-containing tetrafluoroethylene polymer), 3.42 parts by mass of an amorphous silicon dioxide (Sylysia 430, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 1.84 parts by mass of butyl acetate, 41.15 parts by mass of ethyl acetate, 82.30 parts by mass of MEK, and 0.11 parts by mass of an amino modified-methylpolysiloxane (a release accelerator, Shin-Etsu Chemical). The amorphous silicon dioxide had an average particle size (volume average diameter as described above) of 4.1 µm as determined with a particle size analyser (SALD-2200, Shimadzu Corporation) by laser diffraction particle size analysis.

The release film 2 had a thickness of 60±5 µm. The base layer in the release film 2 had a thickness of 38 µm±10%. Of the two surface layers in the release film 2, the mold-side surface layer had a thickness of 5.5±0.5 µm and the molded article-side surface layer had a thickness of 3.5±0.5 µm.

The cured product of the first fluororesin composition (mold-side surface layer) contained 17.65 parts by mass of the amorphous silicon dioxide, 15.39 parts by mass of the isocyanurate-type polyisocyanate, and 11.98 parts by mass of the adduct-type polyisocyanate relative to 100 parts by mass of the hydroxy group-containing tetrafluoroethylene polymer.

The cured product of the second fluororesin composition (molded article-side surface layer) contained 5.26 parts by mass of the amorphous silicon dioxide, 15.39 parts by mass of the isocyanurate-type polyisocyanate, 11.98 parts by mass of the adduct-type polyisocyanate, and 0.16 parts by mass of the amino modified-methylpolysiloxane relative to 100 parts by mass of the hydroxy group-containing tetrafluoroethylene polymer.

(2) Mold Manufacture

Four molds were manufactured. Any of these four molds was a mold for transfer molding consisting of an upper mold and a lower mold, and had an identical shape except for the difference in the irregularity provided on the cavity surface of the upper mold. The irregularity was provided in the position corresponding to the surface 16 of the upper mold 12 in FIG. 1A. Each irregularity was formed by electrical discharge machining.

The surface roughnesses Ra of the region provided with irregularity of each of the four molds described above determined according to JIS B0601 were 2.0 µm, 2.5 µm, 3.0 µm and 3.5 µm, respectively. The mold having a surface whose surface roughness Ra was 2.0 µm is hereinafter referred to as "mold 1". Similarly, the molds having surfaces whose surface roughness Ra was 2.5 µm, 3.0 µm and 3.5 µm are referred to as "mold 2", "mold 3" and "mold 4", respectively.

The material majorly forming each of these four molds was SUS440C. Each of these mold had a hardness of HRC 55 or higher, and its surface had been subjected to hard chromium plating.

(3) Molded Article Manufacture

Using the combinations of the release films and the molds represented in Table 1 shown below, a thermosetting resin (epoxy resin, GE100, Hitachi Chemical Company, Ltd.) was molded. During the molding, a transfer pressure of 8.5 MPa or 5.0 MPa was employed. During the molding, the molding temperature employed for curing the thermosetting resin was 175° C. The glossiness of the surface of each molded article obtained in the molding at an incidence angle of 60° was determined using a glossiness meter (PG-IIM, NIPPON DENSHOKU INDUSTRIES Co., Ltd.). The results of the determination are also represented in Table 1 shown below.

TABLE 1

| Release film | Transfer pressure (MPa) | Mold | Glossiness (60°) |
| --- | --- | --- | --- |
| Release film 1 | 8.5 | Mold 1 | 5.8 |
| | | Mold 2 | 5.5 |
| | | Mold 3 | 5.2 |
| | | Mold 4 | 4.7 |
| | 5.0 | Mold 1 | 5.9 |
| | | Mold 2 | 5.6 |
| | | Mold 3 | 5.4 |
| | | Mold 4 | 4.9 |
| Release film 2 | 8.5 | Mold 1 | 37.1 |
| | | Mold 2 | 29.2 |
| | | Mold 3 | 23.0 |
| | | Mold 4 | 16.4 |
| | 5.0 | Mold 1 | 41.3 |
| | | Mold 2 | 34.0 |
| | | Mold 3 | 27.8 |
| | | Mold 4 | 20.5 |

As shown in Table 1, when using release film 1, the glossiness was reduced along with increase in Ra of the mold. Based on these results, it is known that the irregularity of each mold 1 to 4 was reflected on the state of the surface of the molded article via the release film 1.

Also when using the release film 2, the glossiness was reduced similarly along with increase in Ra of the mold. Based on these results, it is known that the irregularity of each mold 1 to 4 was reflected on the state of the surface of the molded article via the release film 2.

When four results obtained by using the mold 1 are compared, it was revealed that the difference in the release film resulted in the difference in the glossiness of the surface of the molded article even when using an identical mold. The release films 1 and 2 are different in the composition of the molded article-side surface layer, especially different in the content ratio of the particles in the surface layer. Based on these results, it was revealed that the shape of the surface layer of the release film, especially the shape attributable to the particles in the surface layer was reflected on the state of the surface of the molded article.

Based on these results, it was revealed that the combination of the mold and the release film according to the present invention allows the state of the surface of the molded article to be conditioned. For example, it was revealed that such combination allows the glossiness of the molded article surface to be adjusted.

In addition, the state of the surface (particularly the state of the irregularity of the surface) of all molded articles obtained was different from the irregularity of the mold surface, and also different from the state of the surface of the molded article-side surface layer of the release film employed. Based on these results, it is considered that both of the irregularity of the mold surface and the shape of the molded article-side surface layer of the release film contribute to the conditioning of the state of the surface (particularly the state of the irregularity of the surface) of the molded article.

During the molding, any of the release films released from the molded article smoothly. Therefore, it was revealed that a release film constituting a combination of the present invention, after the molded article having irregularity on its surface has been molded, can be released smoothly from the molded article.

Example 2: Evaluation of Molded Article Surface Engraved by Laser Marker (1) Release Film Manufacture As described below, three types of the release films were manufactured.

(1-1) Release Film Manufacture

As a base layer, a film formed of an easily moldable polyethylene terephthalate resin (CH285J, Nan Ya Plastics Corporation, thickness 50 μm) was provided.

Next, two fluororesin compositions (hereinafter referred to as first fluororesin composition and second fluororesin composition) to be applied onto the film were prepared. The first fluororesin composition is for forming a mold-side surface layer. The second fluororesin composition is for forming a molded article-side surface layer.

The first fluororesin composition was prepared by mixing and stirring 100 parts by mass of a hydroxy group-containing tetrafluoroethylene polymer composition (Zeffle GK570, Daikin Industries, Ltd., containing 65% by mass of a hydroxy group-containing tetrafluoroethylene polymer), 11.47 parts by mass of an amorphous silicon dioxide (Sylysia 380, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 6.18 parts by mass of butyl acetate, 44.62 parts by mass of ethyl acetate, and 89.25 parts by mass of MEK. The amorphous silicon dioxide had an average particle size (volume average diameter as described above) of 8.8 μm as determined with a particle size analyser (SALD-2200, Shimadzu Corporation) by laser diffraction particle size analysis.

The second fluororesin composition was the same as the first fluororesin composition except that 0.31 parts by mass of an amino modified-methylpolysiloxane (a release accelerator, Shin-Etsu Chemical) was further added to the first fluororesin composition and that the amount of ethyl acetate was changed to 44.81 parts by mass and that the amount of MEK was changed to 89.63 parts by mass.

Onto one face of the film, the first fluororesin composition was applied, and onto the other face of the film, the second fluororesin composition was applied. The application was performed with a reverse kiss coating apparatus. After the application, these compositions were cured by heating at 150° C. for 60 seconds, giving a release film in which fluororesin layers were laminated on the corresponding faces of the conventional PET resin film (hereinafter referred to as "release film 3").

The release film 3 had a thickness of 70±5 μm. The base layer in the release film 3 had a thickness of 50 μm±10%. Of the two surface layers in the release film 3, the mold-side surface layer had a thickness of 5.5±0.5 μm and the molded article-side surface layer had a thickness of 5.5±0.5 μm.

The cured product of the first fluororesin composition (mold-side surface layer) contained 17.65 parts by mass of the amorphous silicon dioxide, 15.39 parts by mass of the isocyanurate-type polyisocyanate, and 11.98 parts by mass of the adduct-type polyisocyanate relative to 100 parts by mass of the hydroxy group-containing tetrafluoroethylene polymer.

The cured product of the second fluororesin composition (molded article-side surface layer) contained 17.65 parts by mass of the amorphous silicon dioxide, 15.39 parts by mass of the isocyanurate-type polyisocyanate, 11.98 parts by mass of the adduct-type polyisocyanate, and 0.48 parts by mass of the amino modified-methylpolysiloxane relative to 100 parts by mass of the hydroxy group-containing tetrafluoroethylene polymer.

(1-2) Release Film Manufacture

Except that the composition of the second fluororesin composition described above in (1-1) was changed as shown below, a release film was manufactured by a method similar to that for release film 3 in (1-1) described above (hereinafter referred to as "release film 4").

In other words, the second fluororesin composition was prepared by mixing and stirring 100 parts by mass of a hydroxy group-containing tetrafluoroethylene polymer composition (Zeffle GK570, Daikin Industries, Ltd., containing 65% by mass of a hydroxy group-containing tetrafluoroethylene polymer), 9.71 parts by mass of an amorphous silicon dioxide (Sylysia 380, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 5.23 parts by mass of butyl acetate, 44.03 parts by mass of ethyl acetate, 88.07 parts by mass of MEK and 0.30 parts by mass of an amino modified-methylpolysiloxane (a release accelerator, Shin-Etsu Chemical).

The release film 4 had a thickness of 60±5 μm. The base layer in the release film 4 had a thickness of 50 μm±10%. Of the two surface layers in the release film 4, the mold-side surface layer had a thickness of 5.5±0.5 μm and the molded article-side surface layer had a thickness of 5.5±0.5 μm.

The cured product of the first fluororesin composition (mold-side surface layer) contained 17.65 parts by mass of the amorphous silicon dioxide, 15.39 parts by mass of the isocyanurate-type polyisocyanate, and 11.97 parts by mass of the adduct-type polyisocyanate relative to 100 parts by mass of the hydroxy group-containing tetrafluoroethylene polymer.

The cured product of the second fluororesin composition (molded article-side surface layer) contained 14.94 parts by mass of the amorphous silicon dioxide, 15.38 parts by mass of the isocyanurate-type polyisocyanate, 11.97 parts by mass of the adduct-type polyisocyanate, and 0.46 parts by mass of the amino modified-methylpolysiloxane relative to 100 parts by mass of the hydroxy group-containing tetrafluoroethylene polymer.

(1-3) Release Film Manufacture

Except that the composition of the second fluororesin composition described above in (1-1) was changed as shown below, a release film was manufactured by a method similar to that for release film 3 in (1-1) described above (hereinafter referred to as "release film 5").

In other words, the second fluororesin composition was prepared by mixing and stirring 100 parts by mass of a hydroxy group-containing tetrafluoroethylene polymer composition (Zeffle GK570, Daikin Industries, Ltd., containing 65% by mass of a hydroxy group-containing tetrafluoroethylene resin), 3.42 parts by mass of an amorphous silicon dioxide (Sylysia 380, Fuji Silysia Chemical Ltd.), 10 parts by mass of an isocyanurate-type polyisocyanate (a curing agent, Sumidur N3300, Sumitomo Bayer Urethane Co., Ltd.), 7.79 parts by mass of an adduct-type polyisocyanate (a curing agent, Duranate AE700-100), 1.84 parts by mass of butyl acetate, 41.15 parts by mass of ethyl acetate, 82.30 parts by mass of MEK, and 0.11 parts by mass of an amino modified-methylpolysiloxane (a release accelerator, Shin-Etsu Chemical).

The release film 5 had a thickness of 60±5 μm. The base layer in the release film 5 had a thickness of 50 μm±10%. Of the two surface layers in the release film 5, the mold-side surface layer had a thickness of 5.5±0.5 μm and the molded article-side surface layer had a thickness of 3.5±0.5 μm.

The cured product of the first fluororesin composition (mold-side surface layer) contained 17.65 parts by mass of the amorphous silicon dioxide, 15.39 parts by mass of the isocyanurate-type polyisocyanate, and 11.98 parts by mass of the adduct-type polyisocyanate relative to 100 parts by mass of the hydroxy group-containing tetrafluoroethylene polymer.

The cured product of the second fluororesin composition (molded article-side surface layer) contained 5.26 parts by mass of the amorphous silicon dioxide, 15.39 parts by mass of the isocyanurate-type polyisocyanate, 11.98 parts by mass of the adduct-type polyisocyanate, and 0.16 parts by mass of the amino modified-methylpolysiloxane relative to 100 parts by mass of the hydroxy group-containing tetrafluoroethylene polymer.

(2) Mold Manufacture

A mold for compression mold consisting a combination of an upper mold and a lower mold (hereinafter referred to as "mold 5") was manufactured. The irregularity had been formed on the surface of the lower mold constituting the mold. The irregularity was provided in the position corresponding to the surface 26 of the lower mold 23 in FIG. 3A. The irregularity was formed by electrical discharge machining. The surface roughness Ra of the region provided with irregularity determined according to JIS B0601 was 1.0 μm.

The material majorly forming the mold 5 was SUS 440C. The mold 5 had a hardness of HRC 55 or higher, and its surface had been subjected to hard chromium plating.

(3) Molded Article Manufacture

Using any one of release films 3 to 5 and the mold 5, a thermosetting resin (epoxy resin, GE100, Hitachi Chemical Company, Ltd.) was molded. During the molding, the molding temperature employed for curing the thermosetting resin was 175° C. On the surface of each molded article obtained by this molding, letters were engraved using a laser marker (Model MD-S9910 tridimensional YVO4 laser marker, Keyence Corporation). The conditions of the engraving were shown below.

Letter height: 1 mm
Power: 3.6 W
Switch frequency: 40 KHz
Scan speed: 700 mm/s

Engraved letters on each molded article surface were observed by 3D microscope (model VR-3200 3D microscope, Keyence Corporation) and macroscopically.

The results of the observation using the 3D microscope are shown in FIG. 5. As shown in FIG. 5, the molded article obtained using the release film 4 exhibited the letter visibility better than that of the molded article obtained using the release film 3, and the molded article obtained using the release film 5 exhibited the letter visibility further better than that of the molded article obtained using the release film 4. Also when observed macroscopically, similar observation results were obtained. Based on these results, it was revealed that the state of the surface of a molded article can be conditioned by using a release film having different shape of the molded article-side surface layer of the release film even when using a mold having an identical surface irregularity.

Also based on these results, it can be considered that a particle content of the molded article-side surface layer, relative to 100 parts by mass of the fluororesin, of preferably 16 parts by mass or less, more preferably 10 parts by mass or less can improve the visibility of letters or patterns engraved by a laser marker.

REFERENCE SIGNS LIST 11 release film
12 upper mold
13 lower mold

The invention claimed is:

1. A combination, comprising:
a mold used for curing a thermosetting resin, and
a release film placed between the thermosetting resin and the mold during curing, wherein:
the release film comprises:
 a base layer formed of a thermoplastic resin, and
 a surface layer formed of a particle-containing fluororesin and having a surface shape attributable to particles contained in the surface layer,
the fluororesin of the surface layer comprises an isocyanate curing agent and a tetrafluoroethylene resin,
said isocyanate curing agent is a combination of an isocyanurate-type polyisocyanate and an adduct-type polyisocyanate having a mass ratio of 10:6 to 10:10,
the surface layer is laminated to a face of the base layer,
the face is placed on a side of the thermosetting resin during the curing,
the particles are inorganic particles, and an average particle size of the particles determined by laser diffraction particle size analysis is 1 μm to 10 μm,
the mold has an irregularity formed on the face that is brought into contact with the release film during the curing, and
a surface roughness Ra of the face of the mold is 1 μm to 4 μm.

2. The combination according to claim 1, wherein the particles are silicon dioxide.

3. The combination according to claim 1, wherein the thermoplastic resin of the base layer is a polyethylene terephthalate resin.

4. The combination according to claim 1, wherein the thermosetting resin is an epoxy resin.

5. The combination according to claim 1, which is used in a method of manufacturing a molded article that has an irregularity on a surface of the molded article, the method comprising:

a placing step for placing the release film in the mold used for curing the thermosetting resin, a curing step, after the placing step, for curing the thermosetting resin, while being in contact with the release film, in the mold to form the molded article, and a releasing step, after the curing step, for releasing the molded article from the mold thereby obtaining the molded article.

6. The combination according to claim 5, wherein the irregularity formed on the surface of the molded article is different from the irregularity of the mold.

7. The combination according to claim 5, wherein the method is transfer molding process or compression molding process.

8. The combination according to claim 5, wherein in the method, semiconductor devices are sealed in the molded article.

9. The combination according to claim 5, wherein the molded article has a surface whose glossiness at an incidence angle of 60 degrees is 3 to 50.

10. The combination according to claim 1, wherein the tensile breaking strength of the release film is 40 MPa to 200 MPa, as determined at 175° C. in accordance with JIS K7127.

11. The combination according to claim 1, wherein the tensile elongation at break of the release film is 200% to 500%, as determined at 175° C. in accordance with JIS K7127.

12. The combination according to claim 1, wherein the particle on the surface layer of the molded body side are present in an amount of 16 parts by mass or less per 100 parts by mass of fluorinated resin.

* * * * *